DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 489

T877,001

ETHYLENE/VINYL ACETATE COPOLYMER WATER RESISTANT ADHESIVES

Bert Sorelle Gorton, Kennett Square, Pa., assignor to E. I. du Pont de Nemours and Company, Wilmington, Del., a corporation of Delaware

Filed May 28, 1969, Ser. No. 828,768

Int. Cl. C08f *3/56;* C08g *9/10*

U.S. Cl. 260—29.4

No Drawing. 11 Pages Specification

The water resistance of adhesives of ethylene/vinyl acetate copolymer emulsions using polyvinyl alcohol as a protective colloid is improved by the addition of dimethylol urea or a mixture of urea and paraformaldehyde. The addition of an alcohol, such as methanol, prevents coagulation and gelling of the emulsion. An adhesive emulsion composition usually comprises a copolymer of 35 to 12 weight percent ethylene and 65 to 88 weight percent vinyl acetate, 4 to 6 weight percent, based on copolymer weight, of a polyvinyl alcohol protective colloid, the polyvinyl alcohol being present during the formation of the copolymer, 6 to 10 weight percent dimethylol urea (or other urea-formaldehyde adducts) and 3 to 8 percent methanol. The adhesives are useful for bonding porous and non-porous substrates such as film, paper, cloth and leather. Thus, they can be used in preparing articles such as cartons, bags, cups, labels and tubes. They are particularly suitable for use in applications where exposure to moisture is likely. Fillers, pigments, dyes and other additives can be used in the adhesive.